United States Patent
Waters et al.

(10) Patent No.: US 7,063,057 B1
(45) Date of Patent: Jun. 20, 2006

(54) METHOD FOR EFFECTIVELY DIAGNOSING THE OPERATIONAL STATE OF A VARIABLE VALVE LIFT DEVICE

(75) Inventors: James P. Waters, Waterford, MI (US); Jon C. Darrow, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/208,297

(22) Filed: Aug. 19, 2005

(51) Int. Cl.
*F01L 1/34* (2006.01)

(52) U.S. Cl. .............................. 123/90.16; 123/90.17; 123/346; 701/110

(58) Field of Classification Search ................ 123/435, 123/90.15, 90.16, 90.17, 90.18, 90.27, 90.31, 123/690, 345, 346; 73/116, 117.3; 701/110, 701/107, 102
See application file for complete search history.

(56) References Cited

U.S. PATENT DOCUMENTS

| | | | |
|---|---|---|---|
| 6,502,536 B1 | 1/2003 | Lee et al. | |
| 6,615,129 B1 * | 9/2003 | Kabasin | 701/110 |
| 6,810,844 B1 | 11/2004 | Sellnau | |
| 6,834,627 B1 * | 12/2004 | Hiraku et al. | 123/90.15 |
| 6,866,024 B1 | 3/2005 | Rizzoni et al. | |
| 6,883,478 B1 | 4/2005 | Borraccia et al. | |
| 2005/0204805 A1 | 9/2005 | Wukahara et al. | |

OTHER PUBLICATIONS

Lee, Byungho, et al, Engine Control Using Torque Estimation, SAE Technical Paper Series 2001-01-0995, Reprinted from Electronic Engine Controls 2001: Modeling, Controls, OBD and Neural Networks (SP-1585), Detroit, Michigan, Mar. 5-8, 2001.

* cited by examiner

*Primary Examiner*—Thomas Denion
*Assistant Examiner*—Ching Chang
(74) *Attorney, Agent, or Firm*—Jimmy L. Funke

(57) ABSTRACT

A method for diagnosing the operational state of a variable valve lift device (VVL) is provided. The method includes providing a first signal indicative of an estimated position of the VVL, the first signal having a first signal-to-noise ratio; determining that the first signal represents either a first condition indicating that the VVL is operating in one of two modes of operation, a second condition indicating that the VVL is not operating in the two modes of operation, and a third condition where the first signal is not in the first or second conditions; and adjusting a camshaft phase angle when the first signal is in the third condition so that the first signal has a second signal-to-noise ratio, wherein the second signal-to-noise ratio is greater than the first signal-to-noise ratio, whereby the operational state of the VVL is identified as one of the first and second conditions.

20 Claims, 4 Drawing Sheets

METHOD FOR EFFECTIVELY DIAGNOSING THE OPERATIONAL STATE OF A VARIABLE VALVE LIFT DEVICE

TECHNICAL FIELD

The present invention relates to a method for effectively diagnosing the operational state of a variable valve lift device; more particularly, to a method that effectively diagnoses the operational state of a variable valve lift device by changing a camshaft phase angle to maximize the signal-to-noise ratio of a signal indicative of the operational position of the variable valve lift device.

BACKGROUND OF THE INVENTION

Historically, the performance of an internal combustion engine has been limited by fixed valve lift profiles, i.e., fixed timing of the opening and closing of the valves relative to the angular position of the engine crankshaft and fixed lift of the valves. However, modern internal combustion engines may utilize one of several methods and/or devices to vary the valve lift profile to, at least in part, control the flow of gas and/or air into and/or out of the engine cylinders. Modern internal combustion engines may utilize devices, such as, for example, variable valve actuating mechanisms, two-step cam profile switching mechanisms (i.e., variable valve lift devices (VVL)), and deactivation valve lifters to vary the amount by which the valves of an engine are lifted (i.e., opened). Furthermore, engines may utilize devices, such as variable valve actuating mechanisms and cam phasers, to vary the timing of the opening and/or closing of the engine valves relative to the angular position of the engine crankshaft.

One such example of a variable valve lift device is a two-step cam profile switching mechanism. Two-step cam profile switching mechanisms utilize a two-step cam profile switching device, such as, for example, a two-step roller finger follower (RFF), to switch between two discrete valve lift profiles depending at least in part upon engine operating conditions and/or parameters. Two-step systems are relatively simple and are operable over a relatively wide range of engine operating speeds. Further such systems are relatively easy to package on new and even existing engines. By operating the two-step cam profile switching mechanism in conjunction with a cam phaser a wide range of variation in the valve lift characteristic is obtained. The valve lift profile is selected via the two-step cam profile-switching device, and the timing of the valve lift is adjusted and/or varied by the cam phaser.

Currently there are no reliable methods for determining whether one or more variable valve devices such as the two-step cam profile switching mechanisms used in an internal combustion engine are in an improper mode of operation. One existing method for diagnosing the operational state of a two-step cam profile switching mechanism involves the use of existing sensors or requires that additional sensors be integrated into the engine control system solely for diagnostic purposes. One drawback in using existing or integrated sensors to monitor the operational state of the two-step cam profile switching mechanism is that the engine control system that receives the diagnostic signal encounters a poor signal-to-noise. (S/N) ratio. The poor signal-to-noise ratio makes it difficult for the engine diagnostic system to extract a meaningful signal from a high level of background or ambient noise, which may create a situation where the diagnosis of the operational state of the two-step cam profile switching mechanism is unclear. For instance, if the difference in the signals representing a proper mode of operation and improper mode of operation is relatively small, a poor signal-to-noise (S/N) ratio could cause the measured signal to fall in between the signals representing the proper and improper modes of operation, thereby making it difficult to determine the operational state of the two-step cam profile switching mechanism. Since the signal received by the engine diagnostic system could be unclear as to which lift mode the two-step cam profile switching mechanism is operating under, there is no way to reliably determine if the two-step cam profile switching mechanism is operating properly and efficiently.

As the automotive industry migrates to multi-valve engines, ganged or grouped control of individual two-step cam profile switching mechanisms, and multiple lift profiles that are not dissimilar, the ability to diagnose a malfunctioning two-step cam profile switching mechanism will become more difficult. Misdiagnosed or undiagnosed two-step cam profile switching mechanisms could result in emissions non-compliance or the failure of the two-step cam profile switching mechanism or the engine.

What is needed in the art is a method for reliably and accurately determining the operational state of a variable valve lift device.

It is a principal object of the present invention to provide a method for reliably and accurately determining the operational state of a variable valve lift device.

SUMMARY OF THE INVENTION

Briefly described, the present invention is directed to a method for effectively diagnosing the operational state of a two-step variable valve lift device. The method of the present invention may be used when an engine diagnostic system detects sufficient differences between a measured parameter associated with a engine cylinder, such as cylinder pressure or torque, and an expected parameter value for that cylinder given the current engine conditions to indicate that the two-step variable valve lift device may not be operating properly, but insufficient differences to conclusively determine that the two-step variable valve lift device associated with that cylinder is malfunctioning. In other words, the signal indicative of the estimated position of the two-step variable valve lift device falls in between a first condition indicating that the two-step variable valve lift device is operating properly and a second condition indicating that the two-step variable valve lift device is not operating properly. This uncertain diagnostic condition (i.e., grey-zone) detected by the engine's diagnostic system may be caused by a high level of background or ambient noise, which results in a low signal-to-noise ratio. The low signal-to-noise ratio in turn makes it difficult for the engine's diagnostic system to extract a meaningful signal representing the measured parameter associated with the engine cylinder, and thereby determine the operational state of the variable valve lift device.

The method of the present invention includes adjusting the camshaft phase angle from what was originally considered to be an optimal position for torque, power, $NO_X$, and fuel economy, across a range of alternate camshaft phase angle positions to identify a unique camshaft phase angle that increases and maximizes the signal strength of the signal indicative of the position of the variable valve lift device, thereby increasing the signal-to-noise ratio so that the signal can more reliably indicate the operational state of the variable valve lift device. The unique cam phase angle may be obtained using a pre-determined look-up table that is dependant upon the current operating conditions of the engine. By re-positioning the camshaft to a phase angle relative to a crankshaft to maximize the signal-to-noise ratio, a higher degree of certainty and reliability is achieved when diagnosing the operational state of the two-step variable valve lift device.

BRIEF DESCRIPTION OF THE DRAWINGS

The present invention will now be described, by way of example, with reference to the accompanying drawings, in which.

DESCRIPTION OF THE PREFERRED EMBODIMENTS

Generally, as will be described more particularly hereinafter, a method of the present invention is directed to maximizing the effectiveness of diagnosing the operational state of a variable valve lift device. On occasion, diagnostic systems may identify sufficient differences between a measured engine parameter and an expected engine parameter to indicate that the variable valve lift device may be operating improperly, but insufficient differences to conclusively determine that there is a problem. According to the present invention, the re-positioning of the camshaft to a phase angle relative to a crankshaft operates to increase the strength of a signal indicative of the operational state of the variable valve lift device so that the signal-to-noise ratio is increased, thereby achieving a higher degree of certainty and reliability when diagnosing the operational state of the variable valve lift device.

Figure 1:
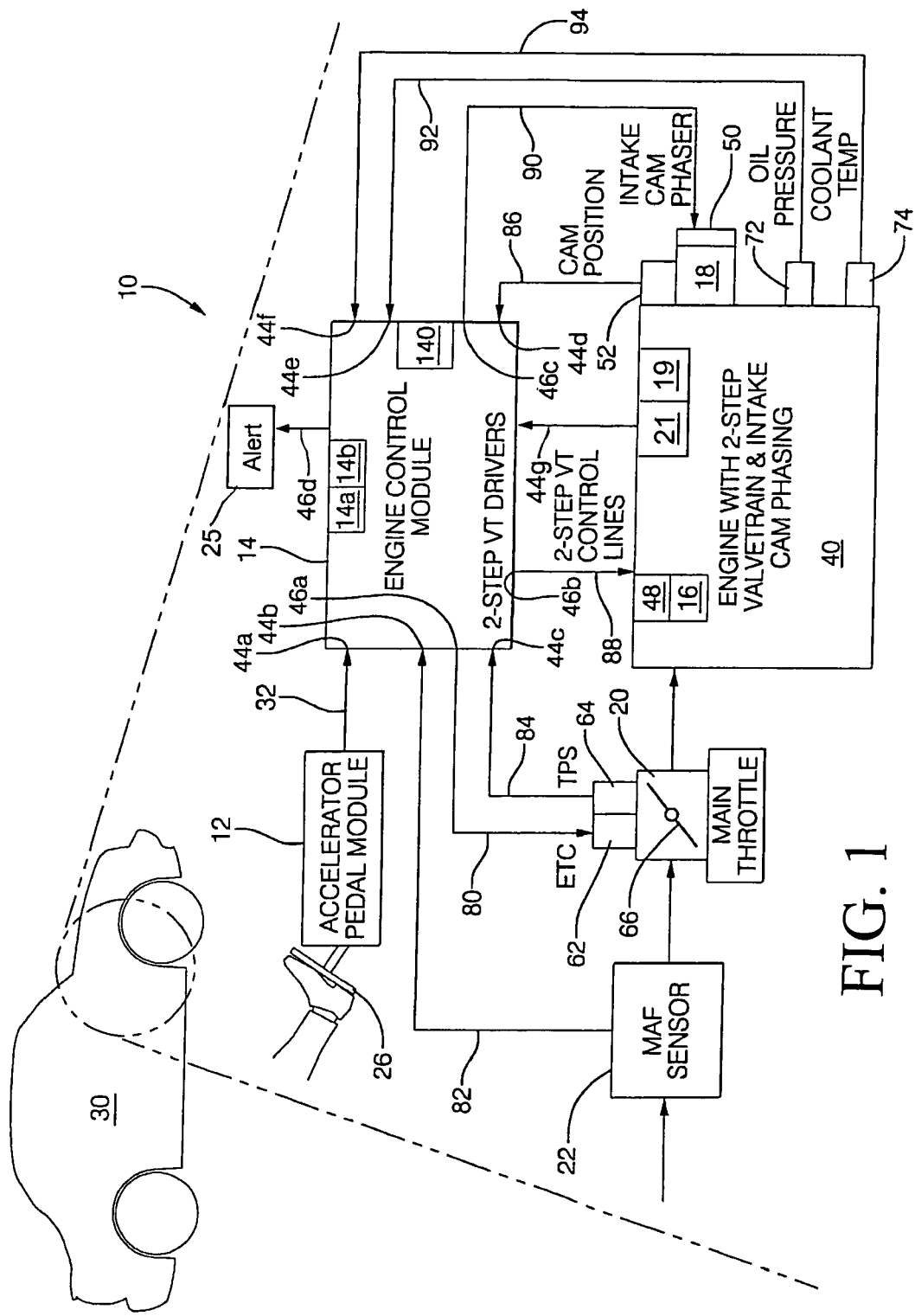
FIG. 1 is a schematic diagram of a system that may be used to implement the method of the present invention, showing an engine control module and an engine including a two-step variable valve lift device.

The method of the present invention may be implemented in using a system 10 as shown in FIG. 1. The system 10 includes a pedal module 12, an engine control module (ECM) 14, a two-step variable valve lift device 16, an intake cam phaser 18, an engine crankshaft 19, an electronic throttle control module (ETC) 20 and a mass air flow (MAF) sensor 22.

In particular, pedal module 12 converts the position of a gas pedal 26 of motor vehicle 30 into a desired load command 32, such as, for example, an electrical signal. Desired load command 32 is indicative of the current position, direction of movement, and rate of movement of gas pedal 26, and determines at least in part the load operating conditions of an engine 40. Pedal module 12 is electrically connected with ECM 14, such that ECM 14 receives desired load command 32.

ECM 14 is a conventional engine control module, including, for example, a microprocessor (not shown) interconnected with various interface circuitry, read only memory 14a and random access memory 14b. Control module 14 further includes a plurality of inputs and outputs through which control module 14 receives and transmits data from and to the devices connected thereto. More particularly, control module 14 includes inputs 44a–44g and outputs 46a–46d, the functions and interconnections of which will be described in greater detail hereinafter. Pedal module 12 is electrically connected with pedal input 44a, which receives desired load command 32.

Figure 2:
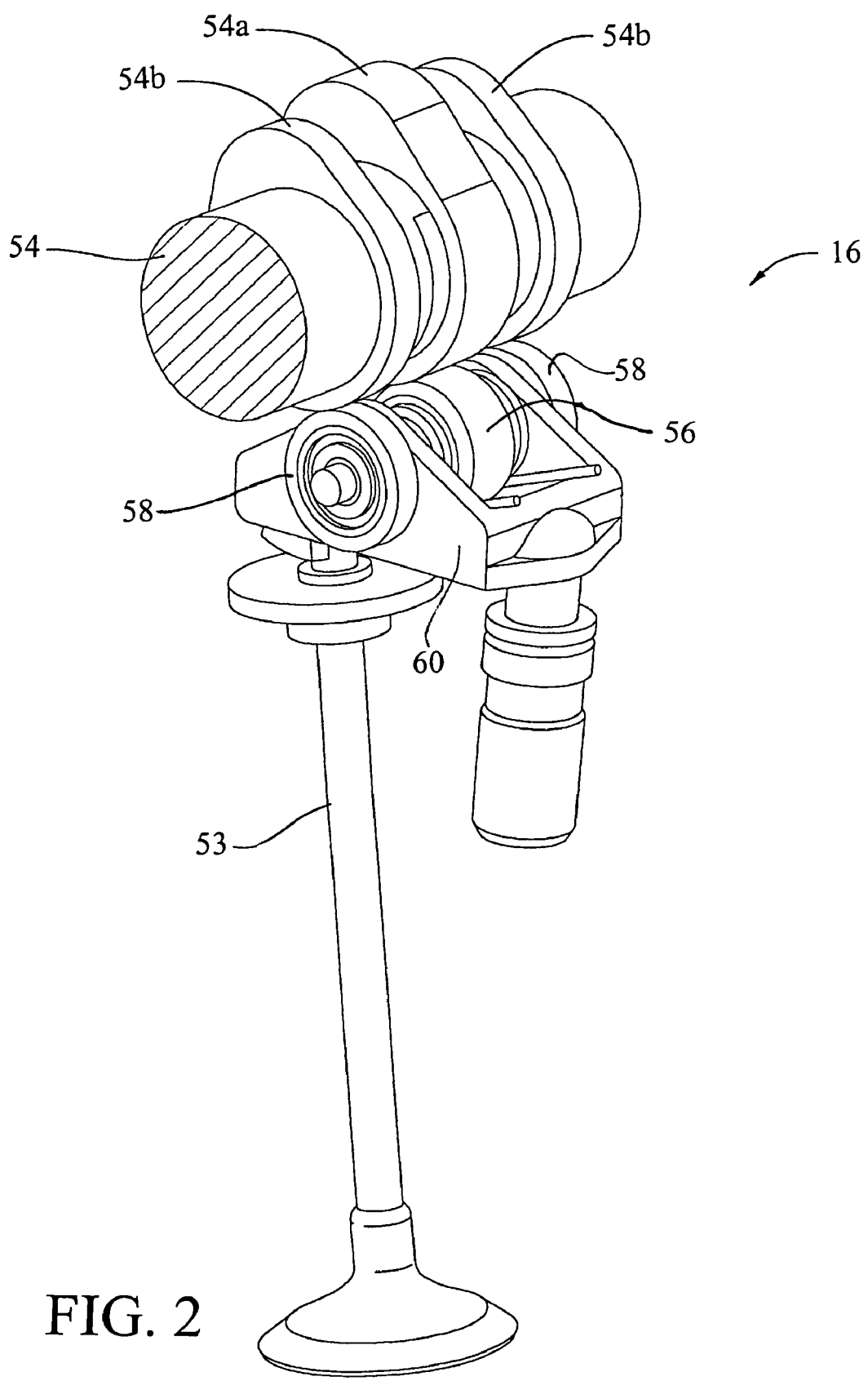
FIG. 2 is a perspective view of the two-step variable valve lift device as installed in the engine.

As best seen in FIG. 2, two-step variable valve lift device 16, such as, for example, a two-step roller finger follower as described in commonly-assigned U.S. Pat. No. 6,502,536 to Lee et al. entitled Method and Apparatus for Two-Step Cam Profile Switching, the disclosure of which is incorporated herein by reference, is switchable between a first/high-lift position and a second/low-lift position. With two-step variable valve lift device 16 in the first position, an associated engine valve 53 is actuated, i.e., lifted, according to a high-lift cam 54a of a camshaft 54 of engine 40. Specifically, in the first/high-lift position, a center roller 56 is coupled with a pair of outer rollers 58 so that high-lift cam 54a controls the motion of a body 60 and thereby the lift of valve 53 in accordance with the high-lift profile.

With variable valve lift device 16 in the second position, the associated engine valve 53 is actuated/lifted according to a low-lift cam 54b of the camshaft 54. Specifically, in the second/low-lift position, center roller 56 is not coupled with a pair of outer rollers 58 and is free to move independently of outer rollers 58. As such, the center roller 56 does not control the motion of the body 60 and valve 53. Instead, low-lift cams 54b engage outer rollers 58 and govern the motion of body 60 and thereby operate to lift valve 53 in accordance with the low-lift profile.

The high-lift cam 54a and low-lift cam 54b have different lifts, duration and timing configured for improving fuel economy. For sake of clarity, only one two-step variable valve lift device 16 is shown. However, it is to be understood that for each valve 53 of engine 40 there may be an associated and corresponding two-step variable valve lift device 16. Further, it is within the scope of the present invention to use a variable valve device having three or more lift profiles.

Associated with each variable valve lift device 16 is a corresponding two-step actuating device 48, such as, for example, an electronically controlled solenoid, that switches the associated variable valve lift device 16 between high and low lift positions. As stated above, only one two-step switching device is shown for the sake of clarity, and therefore only one two-step actuating device 48 is shown. Each two-step actuating device 48 is electrically interconnected with a respective switching output 46b (only one shown) of ECM 14.

Figure 3:
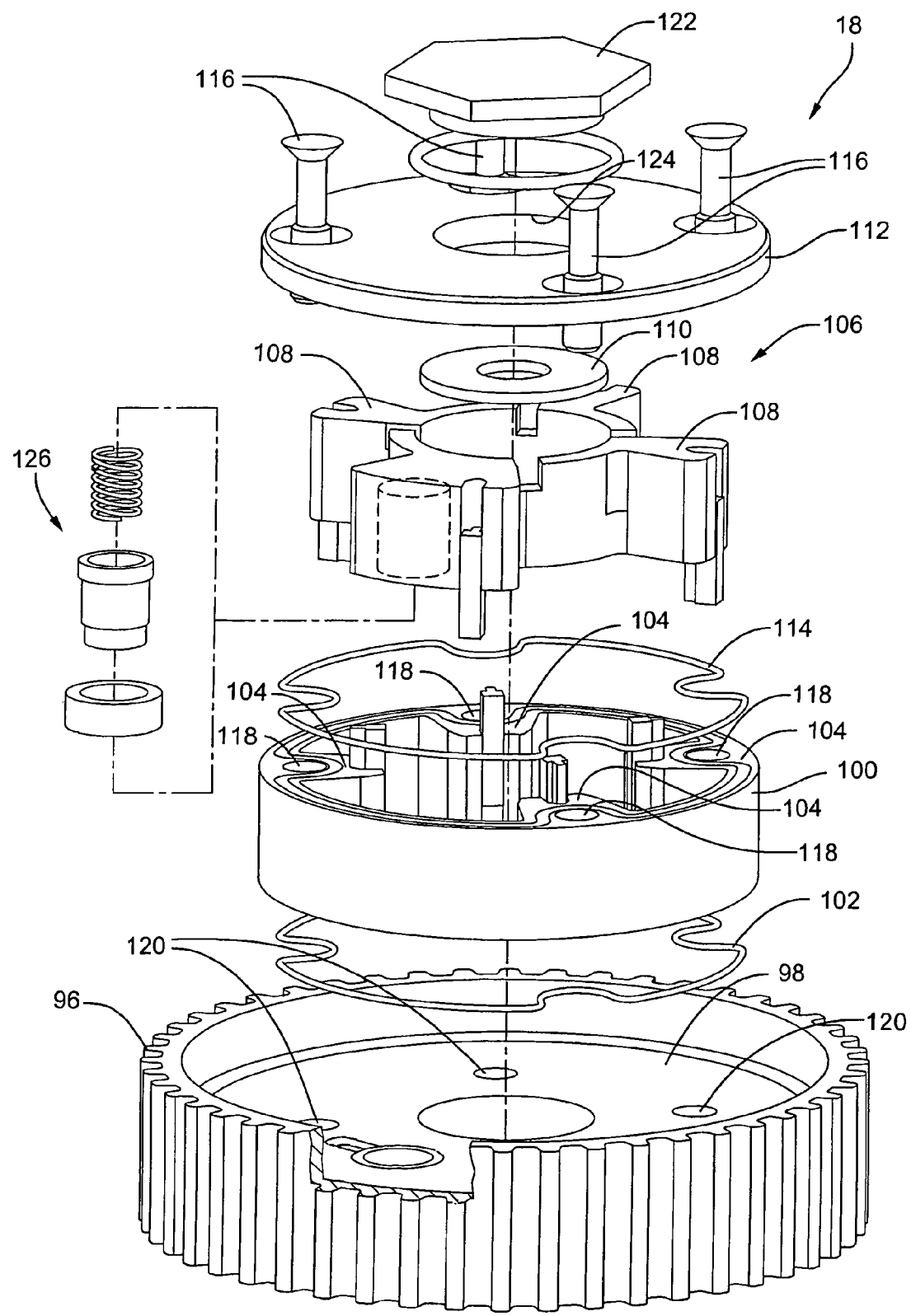
FIG. 3 is an exploded isometric view of a vane-type camshaft phaser that may be used in the engine.

Referring to FIGS. 1 and 3, intake cam phaser 18 may be a conventional cam phaser as described in commonly-assigned U.S. Pat. No. 6,883,478 to Borraccia et al., entitled Fast-Acting Lock Pin Assembly for a Vane-Type Cam Phaser, which was filed on May 16, 2003, the disclosure of which is incorporated herein by reference. Cam phaser 18 may include a pulley or sprocket 96 for engaging a timing chain or belt (not shown) operated by crankshaft 19. The upper surface 98 of pulley/sprocket 96 forms a first wall of a plurality of hydraulic chambers in the assembled phaser. A stator 100 is disposed against surface 98 and is sealed thereto by a first seal ring 102. Stator 100 is rotationally immobilized with respect to pulley/sprocket 96. Stator 100 is provided with a plurality of inwardly-extending lobes 104 circumferentially spaced apart for receiving a rotor 106 including outwardly extending vanes 108 which extend into the spaces between lobes 104. Hydraulic advance and retard chambers are thus formed between lobes 104 and vanes 108. A thrust washer 110 is concentrically disposed against rotor 106, and cover plate 112 seals against stator 100 via a second seal ring 114. Bolts 116 extend through bores 118 in stator 100 and are received in threaded bores 120 in pulley/sprocket 96, immobilizing the stator with respect to the pulley/sprocket. In installation of a camshaft of engine 40, cam phaser 18 is secured via a central bolt (not shown) through thrust washer 110 which is covered by cover plug 122 which is threaded into bore 124 in cover plate 112. The cam phaser may also include a locking bolt mechanism 126.

Intake cam phaser 18 enables phasing of the intake cam relative to engine crankshaft 19, i.e., the angular position or phase angle of the camshaft 54 relative to crankshaft 19 of engine 40. Intake cam phaser 18 thus enables the opening and/or closing of the intake valves of engine 40 to be phased relative to the rotational or angular position of crankshaft 19, thereby phasing the opening and/or closing of the valves relative to piston position. Preferably, intake cam phaser 18 has a wide range of authority, i.e., is capable of phasing the intake cam over a wide range of angles relative to engine crankshaft 19, and is capable of substantially continuous phasing of the intake cam relative to engine crankshaft 19, rather than discrete phasing. Associated with intake cam phaser 18 are phaser actuating device 50 and cam position sensor 52.

Phaser actuating device 50, such as, for example, a fluid control valve or electric motor, is associated with and actuates cam phaser 18. Phaser actuating device 50 is electrically interconnected with phaser control output 46c of ECM 14. Cam position sensor 52, such as, for example, a conventional electrical, optical or electromechanical cam position sensor, is associated with cam phaser 18. Cam position sensor 52 is electrically connected to cam position input 44d of ECM 14.

Engine crankshaft 19 is a portion of engine 40 that translates reciprocating linear motion of the pistons within engine 40 into rotational motion. The rotational motion of the crankshaft 19 is then transferred through the transmission to drive the wheels of the vehicle. Crankshaft 19 typically includes a sprocket having a plurality of teeth formed therein. The speed at which crankshaft 19, and therefore the crank teeth, rotate is dependant upon the frequency at which the pistons are moving within its associated cylinder, which in turn depends on the lift profile (i.e., high lift or low lift) of valve 53. In general, the greater the lift of valve 53, the greater the pressure and torque produced by the associated piston/cylinder, which in turn translates into the crankshaft 19 being rotated at a higher rate. In other words, the lift position of variable valve lift device 16 (i.e., high lift or low lift) affects the pressure or torque produced by the piston/cylinder and the speed that crankshaft 19 and the crank teeth rotate. A crankshaft sensor 21 is electrically connected to crankshaft position input 44g of ECM 14, and operates to transmit information related to crankshaft 19 to ECM 14, such as the instantaneous crank tooth speed from tooth-to-tooth.

Electronic throttle control module (ETC) 20 is a conventional electronic throttle control module, and includes ETC actuating device 62 and throttle position sensor (TPS) 64. ETC 20 further includes a main throttle valve 66 that controls the flow of air into engine 40. ETC actuating device 62, such as, for example, a stepper motor, is electrically connected to throttle control output 46a of ECM 14, and is operable to rotate main throttle valve 66 to a desired position. TPS sensor 64 is a conventional throttle position sensor, which senses the position of throttle valve 66 and is electronically connected to throttle position input 44c of ECM 14.

Mass air flow (MAF) sensor 22 is a conventional mass air flow sensor that measures the amount of air flowing through main throttle valve 66. MAF sensor 22 is electrically connected to MAF sensor input 44b of ECM 14.

In use, ECM 14 receives a plurality of electrical signals at the inputs thereof. More particularly, pedal module 12 is electrically interconnected with input 44a of ECM 14, which receives desired load command 32. Desired load command 32 is indicative of the position, rate of change and direction of change in the position of gas pedal 26. MAF sensor input 44b of ECM 14 is electrically connected to MAF sensor 22, which issues MAF sensor signal 82. MAF sensor signal 82, such as, for example, a pulsed or pulse-width modulated electrical signal, is indicative of the amount or mass of air flowing through main throttle valve 66. Throttle position input 44c of ECM 14 is electrically connected to TPS Sensor 64, which issues TPS sensor signal 84. TPS sensor signal 84, such as, for example, an analog voltage is dependent at least in part upon the position of main throttle valve 66. Cam position input 44d of ECM 14 is electrically connected to cam position sensor 52, which issues cam position signal 86. Cam position signal 86, such as, for example, a digital electrical signal, is indicative of the position of the camshaft (not shown) of engine 40. Inputs 44e and 44f of ECM 14 are electrically connected to oil pressure sensor 72 and coolant temperature sensor 74, respectively, and receive signals 92 and 94 therefrom corresponding to oil pressure and coolant temperature. Crankshaft input 44g of ECM 14 is electrically connected to crankshaft sensor 21, which issues a crankshaft signal 23. Crankshaft signal 23, such as, for example, a digital electrical signal or a pulsed or a pulse-width modulated signal, may be indicative of the instantaneous crankshaft tooth speed from tooth-to-tooth. It will be understood that ECM 14 may also receive signals representing any other engine parameter that can be correlated to a diagnostic value that represents an estimated position of the variable valve lift device, such as, but not limited to, an individual cylinder air-fuel ratio, an air flow measurement through engine 40, and individual cylinder pressure or torque.

Similarly, ECM 14 issues a plurality of outputs. More particularly, throttle control output 46a of ECM 14 is electrically connected to ETC actuating device 62. ECM 14 issues an output 46a ETC control signal 80, such as, for example, a pulsed or a pulse-width modulated signal, to operate ETC actuating device 62 and thereby position main throttle valve 66 to achieve a desired amount or mass of air flow. As ETC control signal 80 is issued, TPS sensor signal 84 is monitored by ECM 14 to ensure throttle valve 66 is moving in the direction and to the position desired. ECM 14 issues an output 46b two-step actuating device control signal 88, such as, for example, a peak and hold analog voltage, to operate two-step actuating device 48 and thereby place two-step variable valve device 16 into a desired one of the low-lift or high-lift positions. Thus, one of the high-lift cam or the low-lift cam is selected, and the desired amount of lift is imparted to the valves of engine 40. ECM 14 may issue an output 46c phaser control signal 90, such as, for example, a pulsed or a pulse-width modulated signal, to operate phaser actuating device 50 and thereby position the cam relative to the crankshaft (i.e., camshaft phase angle) to achieve a desired phasing of the valves of engine 40. The desired camshaft angle may be obtained from a table of pre-determined camshaft phase angles that are dependent on at least one of current engine speed, manifold absolute pressure, indicated mean effective pressure, engine torque, instantaneous crankshaft velocity, instantaneous crankshaft acceleration, ionization current, and cylinder air-fuel ratios.

ECM 14 may also issue an alert signal 46*d* to enable an alert malfunction indicator light 25 (MAL) if it is determined that variable valve lift device 16 is operating in an improper mode of operation.

Generally, ECM 14 is programmed to conjunctively control two-step variable valve lift device 16, cam phaser 18 and ETC 20 to increase fuel efficiency and decrease undesirable emissions relative to an engine having neither, or only one, of a two-step variable valve lift device or a cam phaser. Further, ECM 14 is programmed to conjunctively control two-step variable valve lift device 16 and cam phaser 18 to achieve a degree of fuel economy improvement and emissions reduction that approaches the level of improvement achieved in an engine incorporating a more complex continuously variable valve actuating mechanism. Moreover, ECM 14 is programmed to control the cam phaser 18 to allow for the effective and reliable diagnosis of the operational state of the two-step variable valve lift device 16 in accordance with the present invention. Also, ECM 14 is programmed to control ETC module 20, and thereby the position of main throttle valve 66, to allow for switching between the low-lift and high-lift cam profiles.

Figure 4:
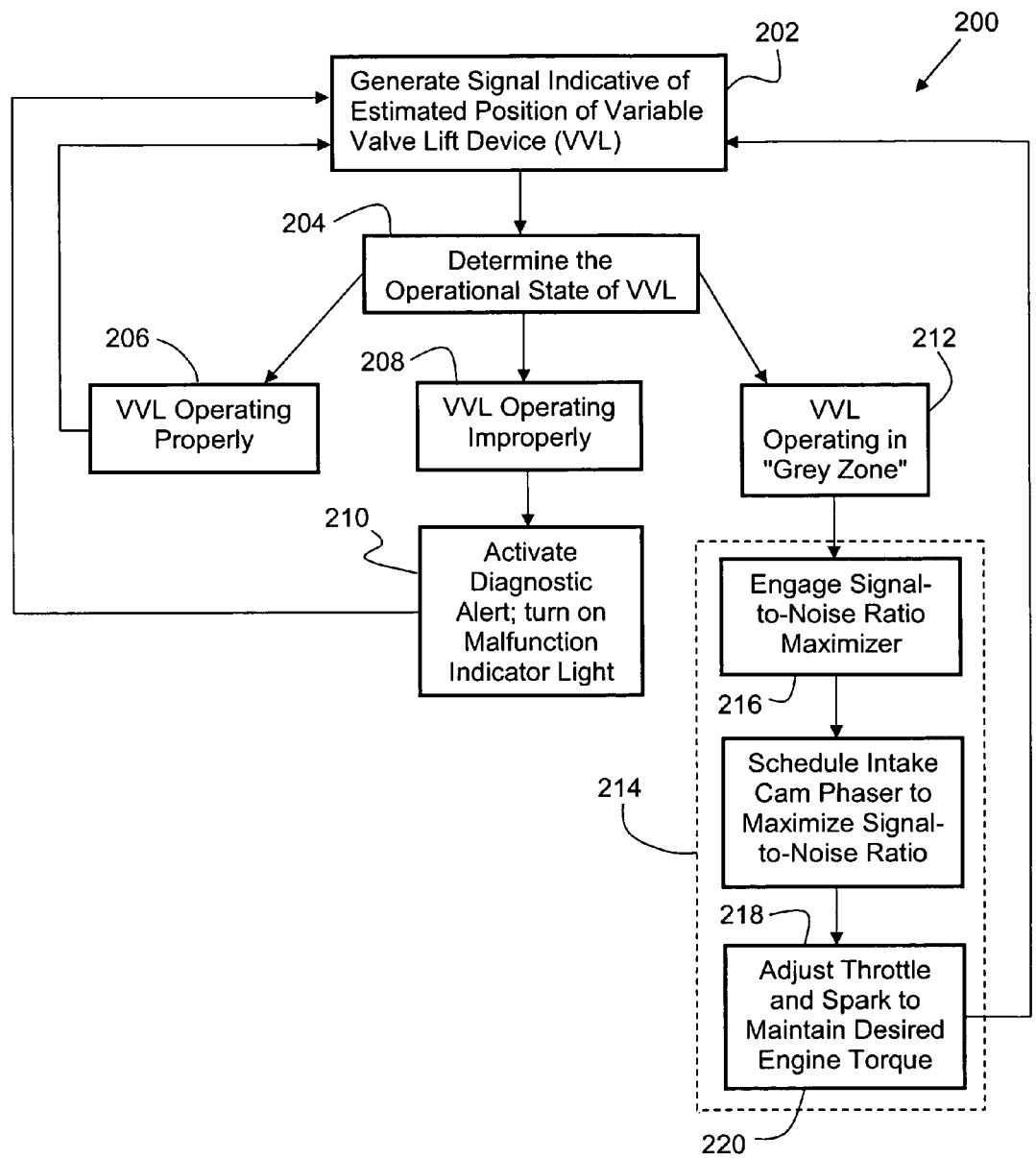
FIG. 4 is a flow chart of one embodiment of the diagnostic method of the present invention.

Referring now to FIG. 4, a flow chart of one embodiment of a method 200 according to the present invention is shown. The method 200 may be accessible to and executed by ECM 14 in accordance with pre-programmed algorithms, execution instructions or sequences, computations, software code modules, interface specifications or the like. It will be understood and appreciated that method 200 performed by ECM 14 may be implemented in a computing environment such as a personal computer (PC) or other computing device. Such computer may also include a storage device including volatile and nonvolatile, removable and non-removable media implemented in any method or technology for storing information such as program modules, data structures, computer readable instructions, or other data.

The computer storage media may include, but is not limited to, floppy disks, conventional hard disks, read only memory (ROM) 14*a*, random access memory (RAM) 14*b*, flash memory, electrically erasable programmable read-only memory (EEPROM), or other types of memory, magnetic cassettes, magnetic tape, magnetic disk storage or other magnetic storage devices, CD-ROM, digital versatile disks (DVD) or other optical disk storage, or any other medium which can be used to store the desired information and which can be accessed by the computer.

ECM 14 may also include communication media for sending and receiving signals, instructions or other parameters from other components in the automotive system, such as gas pedal 26 and throttle position sensor 64. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a direct wired connection, and wireless media such as acoustic, radio frequency, infrared and other wireless media. It will be understood that combinations of any of the above should also be included within the scope of computer readable media.

Generally, the method 200 is initiated by the generation of a signal indicative of an estimated position of the variable valve lift device at step 202, wherein the signal has an initial strength and signal-to-noise ratio. The signals indicative of the estimated position of the variable valve lift device may be generated using various diagnostic methods such as, but not limited to, the individual cylinder air-fuel ratio control method, the air flow meter method, and the cylinder torque/pressure based method.

For example, if the cylinder torque/pressure based diagnostic method is used, the method 200 may be initiated by measuring certain engine parameters, including the instantaneous rotational speed of crankshaft 19. The rotational speed of crankshaft 19 may be obtained by measuring the time interval for teeth on the crankshaft to pass by a fixed point adjacent the crankshaft. Signals 44*g* indicative of the speed of the crankshaft are sent to ECM 14 wherein the crankshaft speed may be instantaneously determined in real-time. The measured crankshaft speed may then be mapped and correlated with a corresponding estimated cylinder torque or cylinder pressure value. In particular, the estimated cylinder torque or cylinder pressure may be determined using transfer functions in the time-domain, frequency domain or crank angle domain correlating to the measured crankshaft speed. The preferred method of correlating the crankshaft speed to cylinder torque or cylinder pressure is using the frequency domain analysis shown and described in U.S. Pat. No. 6,866,024 to Rizzoni et al., which is hereby incorporated by reference. Generally, the frequency domain analysis involves mapping the frequency domain component of the energy of the first 4 harmonics of the fluctuating crankshaft speed through a correlation table to obtain an estimate of the instantaneous cylinder pressure or cylinder torque value. Once the estimated cylinder torque or cylinder pressure has been obtained for one or more of the engine cylinders, this estimate may be stored in memory 14*a*, 14*b* in ECM 14 as the estimated torque or pressure for each of the cylinders.

The method 200 then continues by using the signal indicative of the estimated position to determine the operational state of the variable valve lift device at step 204. The estimated torque or pressure for each of the cylinders is then compared with expected ranges of cylinder pressure or torque, which may fall into three possible operational conditions for the variable valve lift device that may represent a distinct range of values or a single value. With continuing reference to the cylinder torque/pressure based example provided above, the variable valve lift device is operating in a first condition at step 206 if the estimated torque or pressure falls in between a torque or pressure range that is associated with at least one of the high or low lift positions of the variable valve lift device. In the first condition, the variable valve lift device is operating in its proper mode of operation (i.e., high or low lift position) and the method 200 proceeds back to step 202.

The variable valve lift device is operating in a second condition at step 208 if the estimated torque or pressure falls within an expected torque or pressure range that is associated with an improperly operating variable valve lift device. In the second condition, the two-step variable valve lift device is operating improperly and a fault counter is initiated. If the fault counter exceeds a predetermined calibrated threshold, then ECM 14 sends alert signal 46*d* (FIG. 1) to activate malfunction indicator light 25 to provide a notification that variable valve lift device 16 is malfunctioning at step 210, and the method 200 proceeds back to step 202.

The variable valve lift device is operating in a third condition (i.e., a grey-zone) at step 212 if the estimated torque or pressure either falls outside the ranges associated with the first and second conditions, or falls in both of the ranges associated with the first and second conditions (i.e., the ranges for the first and second conditions overlap) so that the ECM 14 is not able to diagnose the operational state of the variable valve lift device. Therefore, the estimated torque or pressure may fall within both the first and second conditions, thereby indicating that there may be a problem with the variable valve lift device, but providing an operational diagnosis that is uncertain. The estimated torque or pressure may fall within the third condition because the signal generated at step 202 has a low signal-to-noise ratio due to a high level of background or ambient noise in the engine. The low signal-to-noise ratio also may be caused in part due to the position of the camshaft phase angle being based on factors such as optimum fuel economy, emissions, torque, power, or a combination thereof.

If it is determined that the variable valve lift device may be operating in the third condition at step 212, then an intrusive algorithm is activated at step 214. In step 214, a signal-to-noise maximizer is engaged at step 216. Further, intake cam phaser 18 operates to adjust the camshaft relative to the crankshaft at step 218 to a pre-determined camshaft phase angle that may be obtained from a pre-established look-up table. The camshaft phase angle that is selected may be unique and based on at least one of engine speed, manifold absolute pressure, indicated mean effective pressure, engine torque, instantaneous crankshaft velocity, instantaneous crankshaft acceleration, ionization current, and cylinder air-fuel ratios. However, the selected camshaft phase angle is selected to increase or maximize the signal strength of the signal generated at step 202, thereby increasing or maximizing the signal-to-noise ratio thereof, which allows for a more reliable determination of the operational state of the variable valve lift device. In operation, adjusting the camshaft phase angle changes the lift characteristics of valve 53, which results in a change in the amount of air permitted to flow into the engine. By changing the air flow within the engine, the strength of the signal indicative of the estimated position of the variable valve lift device is increased, thereby shifting the estimated position of the variable valve lift device closer to, or within, one of the first and second conditions. In other words, the camshaft phase angle may be adjusted according to a table of pre-determined camshaft phase angles for the purpose of maximizing the signal difference between properly operating variable valve lift devices and improperly operating variable valve lift devices. The shift of the signal toward, or within, one of the first or second conditions provides a more reliable indication as to whether the variable valve lift device is operating properly or improperly.

Since the camshaft phase angle has been adjusted and the amount of air that is flowing through the engine has changed, the amount of torque the engine is producing may have been affected. Therefore, as best seen in FIGS. 1 and 4, the throttle 66 and spark may be adjusted to maintain the desired torque output of engine at step 220. The method 200 may then proceed back to step 202.

One alternative embodiment relates to variable valve lift engines that do not employ a traditional continuously variable camshaft phasers that use fixed camshafts or other mechanisms of shifting intake valve opening (IVO) and intake valve closing (IVC) for high-lift and low-lift modes. In this alternative embodiment, the "diagnosability" factor is incorporated into the trade-off analysis along with factors such as torque, power, emissions, and fuel economy when determining the best overall IVO and IVC timing for both high-lift and low-lift modes.

Furthermore, while the method of the present invention described as increasing or maximizing the signal-to-noise ratio by phasing the intake cam phaser to allow for a more reliable diagnosis of the variable valve lift device, it is also within the scope of the present invention to increase or maximize the signal-to-noise ratio by using the method in intake only engines, exhaust phaser only engines, dual independent cam phasing (DICP) (both intake and exhaust) engines, and by using "dual equal" cam phasing where both the intake and exhaust cams are coupled together and therefore are phased together. Also, the "dual equal" cam phasing may be used in an overhead valve (OHV) structural design where there is one single cam for the whole engine, wherein both the intake and exhaust lobes function one the one single camshaft. The use of the method in these environments results in a change in the pumping of the engine to increase or maximize the signal-to-noise ratio. This result may be achieved by adjusting one or both of the cams.

The method of the present invention offers numerous advantages over the existing art. For instance, the method may be used with an existing variable valve lift device to achieve a higher degree of certainty in diagnosing its current operational state, thereby resulting in greater reliability, reduced warranty, reduced No Trouble Found (NTF) warranty, and a lower life-cycle cost of the variable valve lift device technology.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for diagnosing the operational state of a variable valve lift device in an engine, the engine including a camshaft and a crankshaft, the variable valve lift device having at least two modes of operation and being associated with the camshaft and the crankshaft, the method comprising:

providing a first signal indicative of an estimated position of the variable valve lift device, the first signal having a first signal-to-noise ratio;

determining that the first signal represents one of a first condition indicating that the variable valve is operating in said at least one of the two modes of operation, a second condition indicating that the variable valve is not operating in said at least one of the two modes of operation, and a third condition where the first signal is not in the first condition or the second condition; and adjusting the camshaft relative to the crankshaft to establish a camshaft phase angle when the first signal is in the third condition so that the first signal has a second signal-to-noise ratio, wherein the second signal-to-noise ratio is greater than the first signal-to-noise ratio, whereby the operational state of the variable valve lift device is then identified as one of the first condition and the second condition.

2. The method as recited in claim 1, wherein the camshaft phase angle is pre-determined.

3. The method as recited in claim 1, wherein the camshaft phase angle is determined using a pre-established look-up table.

4. The method as recited in claim 1, wherein the camshaft phase angle is determined based on at least one of engine speed, manifold absolute pressure, indicated mean effective pressure, engine torque, instantaneous crankshaft velocity, instantaneous crankshaft acceleration, ionization current, and cylinder air-fuel ratios.

5. The method as recited in claim 1, wherein at least one of the first condition, second condition, and third condition is a distinct signal range.

6. The method as recited in claim 1, wherein the first signal represents one of a camshaft speed, a cylinder pressure and a cylinder torque.

7. The method as recited in claim 1, wherein the strength of the first signal is increased to establish the second signal-to-noise ratio.

8. A system for diagnosing the operational state of a variable valve lift device in an engine, the system comprising:
   a crankshaft;
   a camshaft that is positioned relative to the crankshaft to form a first camshaft phase angle;
   a camshaft phaser for operably controlling the camshaft phase angle;
   a variable valve lift device having at least two modes of operation; and
   an engine control module in operable communication with the camshaft phaser, wherein the engine control module:
      receives a first signal indicative of an estimated position of the variable valve lift device, the first signal having a first signal-to-noise ratio;
      determines that the first signal represents one of a first condition indicating that the variable valve is operating in at least one of the two modes of operation, a second condition indicating that the variable valve is not operating in said at least one of the two modes of operation, and a third condition failing to indicate that the first signal is in the first condition or the second condition; and
      instructs the camshaft phaser to adjust the camshaft relative to the crankshaft to establish a camshaft phase angle when the first signal is in the third condition so that the first signal has a second signal-to-noise ratio, wherein the second signal-to-noise ratio is greater than the first signal-to-noise ratio, whereby the operational state of the variable valve lift device is then identified as one of the first condition and the second condition.

9. The system as recited in claim 8, wherein the camshaft phase angle is pre-determined.

10. The system as recited in claim 8, wherein the camshaft phase angle is determined using a pre-established look-up table.

11. The system as recited in claim 8, wherein the camshaft phase angle is determined based on at least one of engine speed, manifold absolute pressure, indicated mean effective pressure, engine torque, instantaneous crankshaft velocity, instantaneous crankshaft acceleration, ionization current, and cylinder air-fuel ratios.

12. The system as recited in claim 8, wherein at least one of the first condition, second condition, and third condition is a distinct signal range.

13. The system as recited in claim 8, wherein the first signal represents one of a camshaft speed, a cylinder pressure and a cylinder torque.

14. The system as recited in claim 8, wherein the strength of the first signal is increased to establish the second signal-to-noise ratio.

15. A computer-readable medium having computer-executable instructions for performing a method for diagnosing the operational state of a variable valve lift device in an engine, the engine including a camshaft and a crankshaft, the variable valve lift device having at least two modes of operation and being associated with the camshaft and the crankshaft, the method comprising:
   providing a first signal indicative of an estimated position of the variable valve lift device, the first signal having a first signal-to-noise ratio;
   determining that the first signal represents one of a first condition indicating that the variable valve is operating in at least one of the two modes of operation, a second condition indicating that the variable valve is not operating in said at least one of the two modes of operation, and a third condition where the first signal is not in the first condition or the second condition; and
   adjusting the camshaft relative to the crankshaft to establish a camshaft phase angle when the first signal is in the third condition so that the first signal has a second signal-to-noise ratio, wherein the second signal-to-noise ratio is greater than the first signal-to-noise ratio, whereby the operational state of the variable valve lift device is then identified as one of the first condition and the second condition.

16. A method for diagnosing the operational state of a variable valve lift device in an engine, the engine including a camshaft and a crankshaft, the variable valve lift device having at least two modes of operation and being associated with the camshaft and the crankshaft, the method comprising:
   providing a first signal indicative of an estimated position of the variable valve lift device, the first signal having a first signal-to-noise ratio;
   determining that the first signal falls within one of a first range indicating that the variable valve is operating in at least one of the two modes of operation, a second range indicating that the variable valve is not operating in said at least one of the two modes of operation, and a third range where the first signal is in both in the first range and the second range; and
   adjusting the camshaft relative to the crankshaft to establish a camshaft phase angle when the first signal is in the third range so that the first signal has a second signal-to-noise ratio, wherein the second signal-to-noise ratio is greater than the first signal-to-noise ratio, whereby the operational state of the variable valve lift device is then identified as one of the first range and the second range.

17. The method as recited in claim 16, wherein the camshaft phase angle is determined using a pre-established look-up table.

18. The method as recited in claim 16, wherein the camshaft phase angle is determined based on at least one of engine speed, manifold absolute pressure, indicated mean effective pressure, engine torque, instantaneous crankshaft velocity, instantaneous crankshaft acceleration, ionization current, and cylinder air-fuel ratios.

19. The method as recited in claim 16, wherein the first signal represents one of a camshaft speed, a cylinder pressure and a cylinder torque.

20. The method as recited in claim 16, wherein the strength of the first signal is increased to establish the second signal-to-noise ratio.

* * * * *